United States Patent
Huang et al.

(10) Patent No.: US 12,340,201 B2
(45) Date of Patent: Jun. 24, 2025

(54) SERVER AND UPDATING METHOD FOR MAC ADDRESS

(71) Applicant: MITAC COMPUTING TECHNOLOGY CORPORATION, Taoyuan (TW)

(72) Inventors: Jing-Chin Huang, Taoyuan (TW); Chih-Peng Chang, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 535 days.

(21) Appl. No.: 17/743,152

(22) Filed: May 12, 2022

(65) Prior Publication Data

US 2022/0374223 A1 Nov. 24, 2022

(30) Foreign Application Priority Data

May 18, 2021 (TW) .................................. 110117949

(51) Int. Cl.
*G06F 8/65* (2018.01)
*G06F 9/4401* (2018.01)
(Continued)

(52) U.S. Cl.
CPC .............. *G06F 8/65* (2013.01); *G06F 9/4401* (2013.01); *H04L 61/50* (2022.05); *H04L 2101/622* (2022.05)

(58) Field of Classification Search
CPC ........ G06F 8/65; G06F 9/4401; G06F 9/4403; G06F 8/654; H04L 61/50; H04L 2101/622; H04L 61/5038
See application file for complete search history.

(56) References Cited

U.S. PATENT DOCUMENTS

| | | | |
|---|---|---|---|
| 11,750,450 B1* | 9/2023 | Tian | .................... H04L 41/0806 |
| 2014/0101653 A1* | 4/2014 | Dharmadhikari | ......... G06F 8/65 |
| | | | 717/173 |

(Continued)

FOREIGN PATENT DOCUMENTS

| CN | 101471792 A | 7/2009 |
|---|---|---|
| CN | 101615129 A | 12/2009 |

(Continued)

OTHER PUBLICATIONS

Taiwan Patent Office, Office Action, Patent Application Serial No. TW110117949, issued Feb. 17, 2022.

*Primary Examiner* — Noor Alkhateeb
(74) *Attorney, Agent, or Firm* — RABIN & BERDO, P.C.

(57) ABSTRACT

A server and an updating method for a MAC address are provided in the present application. The server includes: a network chipset having a preset first MAC address; a first non-volatile memory storing the first MAC address of the network chipset; a second non-volatile memory storing a first BIOS code data; a central processing unit coupled to the network chipset and the second non-volatile memory; and a baseboard management controller coupled to the central processing unit, the first non-volatile memory, and the second non-volatile memory. The baseboard management controller reads the first non-volatile memory to obtain the first MAC address and stores a second BIOS code data including the first MAC address to the second non-volatile memory, causing the first BIOS code data to be overwritten by the second BIOS code data.

13 Claims, 5 Drawing Sheets

(51) Int. Cl.
*H04L 61/50* (2022.01)
*H04L 101/622* (2022.01)

(56) References Cited

U.S. PATENT DOCUMENTS

2015/0082063 A1* 3/2015 Peterson ................. G06F 13/40
 713/323
2020/0019230 A1* 1/2020 Rong ...................... G06F 1/324

FOREIGN PATENT DOCUMENTS

| CN | 106850875 | A | * | 6/2017 | | |
|---|---|---|---|---|---|---|
| CN | 107621938 | A | * | 1/2018 | | |
| EP | 2648095 | A2 | * | 10/2013 | .......... | G06F 11/1441 |
| JP | 2017027277 | A | * | 2/2017 | ............... | G06F 8/65 |
| TW | 200304622 | A | * | 10/2003 | ......... | G06F 12/1425 |
| WO | WO-2005079411 | A2 | * | 9/2005 | ......... | H04L 61/2007 |
| WO | WO-2013048483 | A1 | * | 4/2013 | ......... | G06F 12/0238 |

\* cited by examiner

SERVER AND UPDATING METHOD FOR MAC ADDRESS

CROSS-REFERENCE TO RELATED APPLICATION

This non-provisional application claims priority under 35 U.S.C. § 119(a) to Patent Application No. 110117949 filed in Taiwan, R.O.C. on May 18, 2021, the entire contents of which are hereby incorporated by reference.

BACKGROUND

Technical Field

The present application relates to a server and an updating method for a MAC (media access control) address, and in particular a server and an updating method capable of restoring the settings of the MAC address.

Related Art

A MAC (media access control) address has 6 bytes in total, the first 3 bytes are the code for the manufacturer that produced the network interface card, the last 3 bytes are the number of the network interface card, and the MAC address is mainly used to identify the address of a network device. Each network interface card or LOM (LAN-on motherboard) is allocated a preset and unique MAC address at the factory. For the stand-alone network interface card, the MAC address is generally stored in an EEPROM (electrically erasable programmable read-only memory) on the network interface card. For the LOM, the MAC address is stored in the flash memory that stores a BIOS (basic input/output system) code. The aforementioned flash memory is usually divided into a descriptor region, a ME (management engine) region, a PDR (platform data region), a DER (device expansion region), a GbE (Gigabit Ethernet) region, and a BIOS region, and the MAC address of the LOM is stored in the GbE region.

When the BIOS is updated by a user, the memory for temporarily storing the BIOS will be refreshed with a new BIOS image file, causing the MAC address written at the factory to be cleared. When the LOM loses its original MAC address, it cannot be allocated an IP (Internet Protocol) address, thereby losing its networking function. For the problem that the MAC address is cleared after updating the BIOS, the current practice is to disassemble the computer to check the MAC address information sticker attached to the LOM, and then manually write the MAC address back to the BIOS through external software.

SUMMARY

In view of this, a server capable of restoring the settings of the MAC (media access control) address is provided by the applicant of the present application. According to some embodiments, a server includes a network chipset, a first non-volatile memory, a second non-volatile memory, a central processing unit, and a baseboard management controller. The network chipset has a preset first MAC address. The first non-volatile memory stores the first MAC address. The second non-volatile memory stores a first BIOS (basic input/output system) code data. The central processing unit is coupled to the network chipset and the second non-volatile memory. The baseboard management controller is coupled to the central processing unit, the first non-volatile memory, and the second non-volatile memory. The baseboard management controller is configured to read the first non-volatile memory to obtain the first MAC address and store a second BIOS code data including the first MAC address to the second non-volatile memory, causing the first BIOS code data to be overwritten by the second BIOS code data.

According to some embodiments, the baseboard management controller receives a third BIOS code data from a remote device and a BIOS update command for updating the first BIOS code data, and the baseboard management controller incorporates the first MAC address into the third BIOS code data according to the BIOS update command to generate the second BIOS code data According to some embodiments, when the baseboard management controller incorporates the first MAC address into the third BIOS code data according to the BIOS update command to generate the second BIOS code data, the server executes an operating system.

According to some embodiments, the first non-volatile memory further stores factory information of the server.

According to some embodiments, the first BIOS code data includes a second MAC address. The baseboard management controller reads the first non-volatile memory and the second non-volatile memory to compare the first MAC address with the second MAC address before the baseboard management controller stores the second BIOS code data to the second non-volatile memory, and the first BIOS code data is overwritten by the second BIOS code data including the first MAC address when the comparison result is different.

According to some embodiments, the baseboard management controller compares, in a POST (power-on self-test) process of the server, the first MAC address with the second MAC address and updates the first BIOS code data with the second BIOS code data including the first MAC address in the POST process.

According to some embodiments, the central processing unit is in a power-off state before the baseboard management controller completes the comparison of the first MAC address with the second MAC address in the POST process.

According to some embodiments, after the baseboard management controller completes the comparison of the first MAC address with the second MAC address in the POST process, the baseboard management controller activates the central processing unit, causing the server enters an S0 state complying with ACPI (advanced configuration and power interface) standard.

According to some embodiments, when the baseboard management controller compares the first MAC address with the second MAC address in the POST process, the server is in an S5 state complying with ACPI standard, causing the central processing unit to be in a power-off state. When the comparison result is not the same, the baseboard management controller activates the central processing unit after the first BIOS code data is overwritten by the second BIOS code data, causing the server switches to an S0 state complying with the ACPI standard from the S5 state.

According to some embodiments, the server is in the S5 state by default after being powered on.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
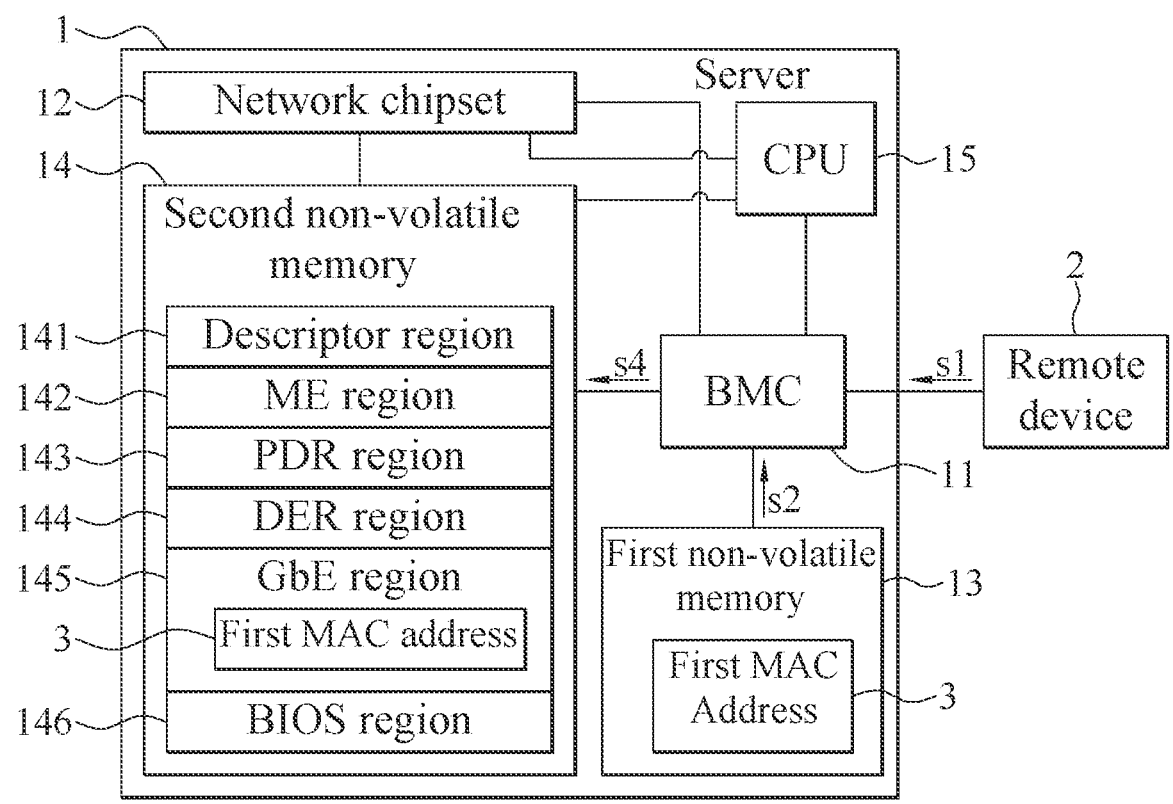
FIG. 1 illustrates a block diagram of a server of the present application in a first embodiment.

FIG. 1 illustrates a block diagram of a server of the present application in a first embodiment. Please refer to FIG. 1. A server 1 includes a baseboard management controller (BMC) 11, network chipset 12, a first non-volatile memory 13, a second non-volatile memory 14, and a central processing unit (CPU) 15. The central processing unit 15 is coupled to the network chipset 12 and the second non-volatile memory 14. The baseboard management controller 11 is coupled to the first non-volatile memory 13, the second non-volatile memory 14, and the central processing unit 15. According to some embodiments, the baseboard management controller 11 can exchange data with a remote device 2 through a public network interface or its dedicated network interface.

According to some embodiments, the baseboard management controller 11 can perform the aforementioned data exchange with the remote device 2 by performing the networking function of the server 1 through the network chipset 12. In detail, please refer to FIG. 1, the network chipset 12 can provide a networking function. The network chipset 12 is allocated a preset MAC (media access control) address (hereinafter referred to as a first MAC address 3 for the convenience of description) at the factory, and the first MAC address 3 can be stored in the first non-volatile memory 13. The second non-volatile memory 14 can be a BIOS (basic input/output system) memory, that is, the second non-volatile memory 14 stores a BIOS code data (hereinafter referred to as a first BIOS code data for the convenience of description), and the first BIOS code data includes the first MAC address 3 of the network chipset 12. When the server 1 operates, the central processing unit 15 can read the first BIOS code data from the second non-volatile memory 14 and execute the first BIOS code data. When executing the first BIOS code data, the central processing unit 15 can obtain the first MAC address from the first BIOS code data, and then the server 1 uses the first MAC address 3 to perform the networking function, thereby performing the aforementioned data exchange with the remote device 2. According to some embodiments, the network chipset 12 may be a network controller chip integrated with a motherboard.

According to some embodiments, when a BIOS code is modified to release a new version of the BIOS code data (hereinafter referred to as a third BIOS code data), the remote device 2 can update the first BIOS code data in the second non-volatile memory 14 through the baseboard management controller 11 of the server 1. Since the released third BIOS code data is likely to be common to different models of servers 1, the third BIOS code data does not include the first MAC address 3 of the network chipset 12 of the specific server. If the third BIOS code data without the first MAC address 3 is updated to the second non-volatile memory 14, the server 1 will not be able to perform the aforementioned networking function according to the third BIOS code data, thereby causing the user of the server 1 cannot control the server 1 through the remote device 2.

Figure 2:
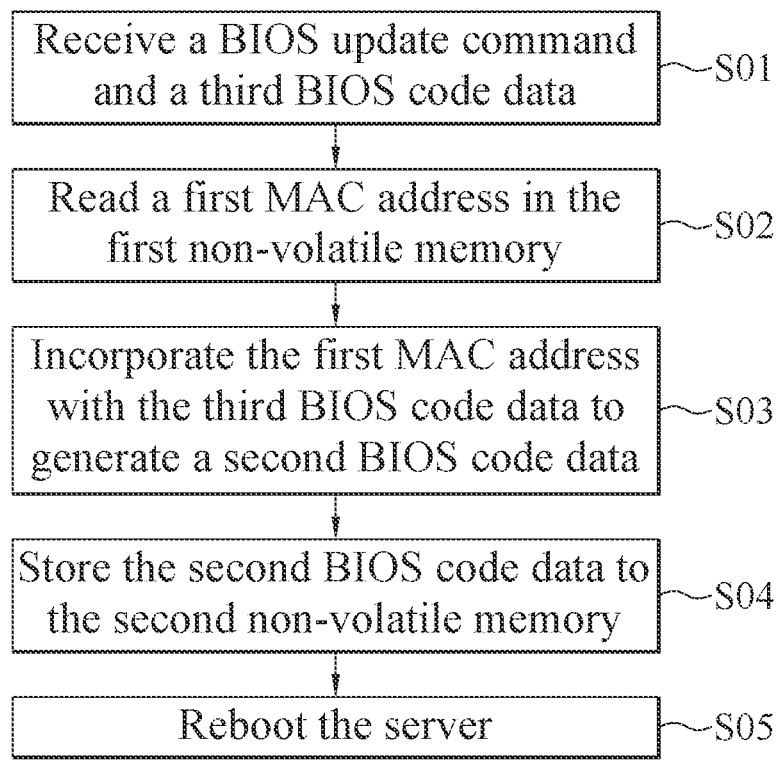
FIG. 2 illustrates a flowchart of the operation of the server of the present application in the first embodiment.

Based on this, please refer to FIG. 1 and FIG. 2 together. FIG. 2 illustrates a flowchart of the operation of the server of the present application in the first embodiment. In the first embodiment, in order to make the network chipset 12 operate normally, the first MAC address 3 of the network chipset 12 is pre-stored (burned) in the first non-volatile memory 13 as a backup. When attempting to update the first BIOS code data of the server 1, the user can transmit a third BIOS code data to be written and a BIOS update command s1 to the baseboard management controller 11 through the remote device 2 (step S01). The third BIOS code data does not have the preset first MAC address 3 of the network chipset 12 of the server 1. After the baseboard management controller 11 receives the BIOS update command s1, the baseboard management controller 11 reads the first MAC address 3 pre-stored in the first non-volatile memory 13 (step S02). The first non-volatile memory 13 outputs address data s2 corresponding to the first MAC address 3, and the baseboard management controller 11 incorporates the address data s2 with the third BIOS code data to form a BIOS code data including the first MAC address 3 (hereinafter referred to as a second BIOS code data s4) (step S03). After that, the baseboard management controller 11 stores the second BIOS code data s4 to the second non-volatile memory 14 (step S04) to update the first BIOS code data and complete the update. After the user reboots the server 1 (step S05), the updated second BIOS code data s4 can be executed, and an IP address is allocated according to the first MAC address 3. The central processing unit 15 can execute the second BIOS code data s4 and perform, according to the second BIOS code data s4 including the first MAC address 3, the networking function through the network chipset 12. The term "reboot" means to cause the server 1 to execute its boot process, resetting the server 1 and causing the operating system to reload.

According to some embodiments, the second BIOS code data s4 can be a BIOS image file, and the second BIOS code data s4 can include the aforementioned BIOS code that has been modified to release a new version and the first MAC address 3 of the network chipset 12. Furthermore, the second non-volatile memory 14 can include a descriptor region 141, a ME (management engine) region 142, a PDR (platform data region) 143, a DER (device expansion region) 144, a GbE (Gigabit Ethernet) region 145, and a BIOS region 146. In step S04, the baseboard management controller 11 can store the aforementioned new version of the BIOS code in the BIOS region 146, and the baseboard management controller 11 can store the first MAC address 3 of the network chipset 12 in a specific offset position in the GbE region 145. After the second BIOS code data s4 is written into the second non-volatile memory 14, the central processing unit 15 can perform the operation of the server 1 according to the new version of the BIOS code stored in the BIOS region 146 and can perform the networking function of the server 1 through the network chipset 12 according to the first MAC address 3 stored in the GbE region 145.

According to some embodiments, the server 1 can perform any step from step S01 to step S04 under a running state of the operating system. That is, after the server 1 completes the POST (power-on self-test) process, the server 1 executes the operating system, and steps S01 to S04 are performed when the operating system is running to complete a remote update process of the BIOS code data.

According to some embodiments, the first non-volatile memory 13 and the second non-volatile memory 14 may be flash memory or read-only memory, such as but not limited to EPROM (erasable programmable read-only memory), flash ROM (read-only memory), EEPROM (electrically erasable programmable read-only memory) or FRU (field-replaceable unit) EEPROM. According to some embodiments, the first non-volatile memory 13 can pre-store factory information of the server 13, such as but not limited to firmware version information, manufacturer, serial number, factory date, or device information. In an embodiment, the first non-volatile memory 13 is a FRU EEPROM, and the second non-volatile memory 14 is a flash memory. At the factory, the first MAC address 3 pre-stored by the network controller (network chipset 12) of the PCH (platform controller hub) is also backed up in the FRU EEPROM that stores other factory information by the device manufacturer, and the first MAC address 3 is also stored in the flash memory where the server 1 stores the BIOS. Furthermore, the FRU EEPROM and the flash memory can be indirectly connected through other components or be directly connected to the baseboard management controller 11 of the server 1, such as but not limited to be connected through I²C or SPI interface. With the updating service network interface of the baseboard management controller 11, the user can update the BIOS of the server 1 by transmitting the BIOS update command s1 and the new BIOS code data (such as the aforementioned BIOS image file) from the remote device 2 to the server 1. Since the new BIOS code data does not have the preset first MAC address 3 of the network controller of the PCH of the user, the baseboard management controller 11 will read the first MAC address 3 backed up by the FRU EEPROM. During the process of refreshing the flash memory storing the BIOS by the baseboard management controller 11, when refreshing the offset for the GbE region 145 to store a MAC address, the first MAC address 3 will be written in instead of the content corresponding to the offset in the original BIOS image file to complete the update.

According to some embodiments, after the baseboard management controller 11 reads the first MAC address 3 pre-stored in the first non-volatile memory 13 (step S02), the baseboard management controller 11 can transmit the first MAC address 3 to the remote device 2 through the network interface. After the remote device 2 receives the first MAC address 3, the remote device 2 can incorporate the first MAC address with the third BIOS code data to generate the second BIOS code data s4 (step S03). The remote device 2 transmits the modified second BIOS code data s4, i.e., BIOS image file to the server 1. After that, the baseboard management controller 11 stores the second BIOS code data s4 to the second non-volatile memory 14 to update the first BIOS code data (step S04) to complete the system update.

Figure 3:
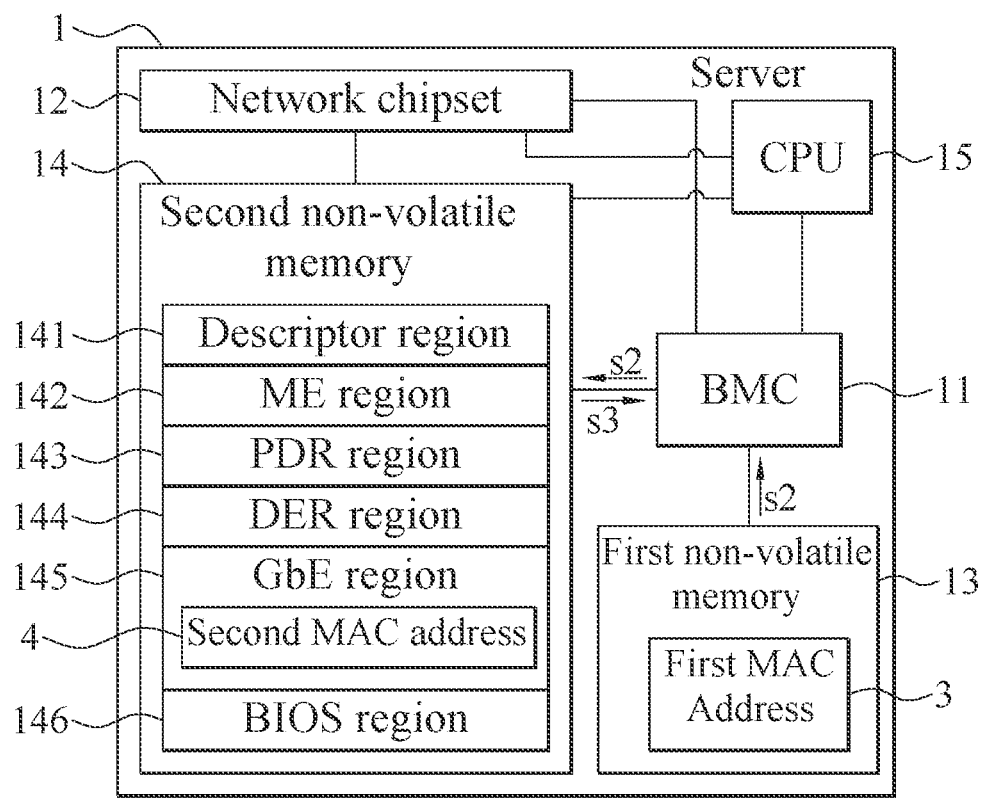
FIG. 3 illustrates a block diagram of a server of the present application in a second embodiment.

FIG. 3 illustrates a block diagram of a server of the present application in a second embodiment. Similar to the first embodiment, the network chipset 12 is allocated the aforementioned first MAC address 3 at the factory; the first non-volatile memory 13 stores the first MAC address 3; and the second non-volatile memory 14 stores the first BIOS code data. The difference between the second embodiment and the first embodiment is that the first BIOS code data includes another MAC address that has not been confirmed whether is the same as the first MAC address 3 (hereinafter referred to as a second MAC address 4). For example, the second non-volatile memory 14 of the server 1 originally stores the BIOS code data with the first MAC address 3. When the second non-volatile memory 14 is refreshed by the user or is provided to a maintenance company to perform the refresh in the case that the server 1 is in a turn-off state, it will cause the second MAC address 4 of the refreshed first BIOS code data may be different from the original first MAC address 3. In this case, when the server 1 is turned on and enters an operating system running state, since the central processing unit 15 has accessed the wrong MAC address during the booting process although reuses the baseboard management controller 11 to rewrite the correct first MAC address 3 back to the updated BIOS, it still cannot be allocated an IP. In view of the aforementioned problem, the user must reboot the server 1 to enable the first MAC address 3 to be correctly accessed by the central processing unit 15. The phrase "the server is turned on" means the power button is pressed and the CPU of the server is powered and initiated and the CPU is permitted to execute the operating system, while the phrase "the server is powered on" means at least the BMC of the server is powered and initiated by standby power.

In view of the foregoing, the second embodiment applies the function that the baseboard management controller 11 can maintain the system when the server 1 is in a turn-off state. The MAC address is checked and replaced by the baseboard management controller 11 at first, and when the baseboard management controller 11 completes the processing, the server 1 continues to perform the booting operation. The baseboard management controller 11 completes the restore operation of the MAC address during the booting process of the server 1, thus the server 1 has no need to perform the second time of booting process.

Figure 4:
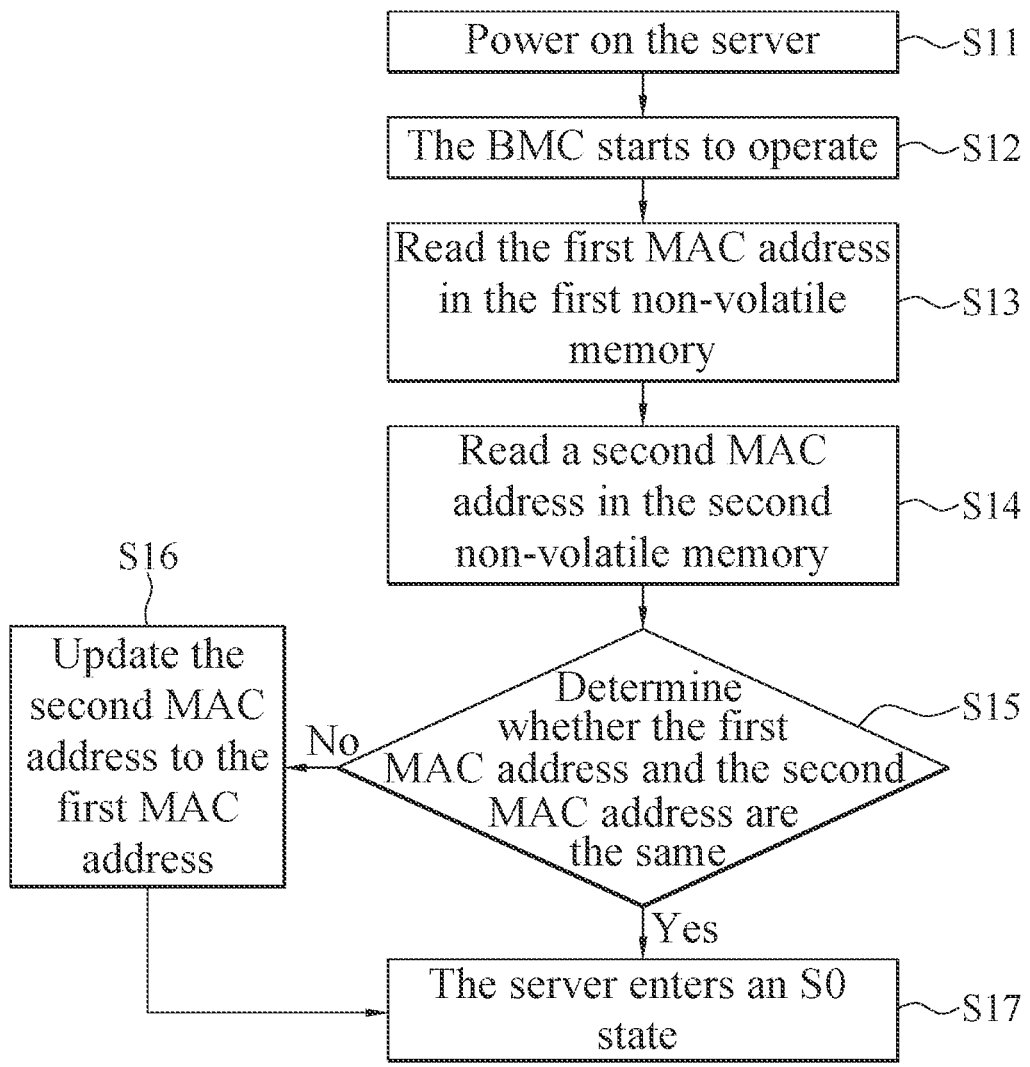
FIG. 4 illustrates a flowchart of the operation of the server of the present application in the second embodiment.

In detail, please refer to FIG. 3 and FIG. 4 together. FIG. 4 illustrates a flowchart of the operation of the server of the present application in the second embodiment. After the server 1 is powered on (step S11), the baseboard management controller 11 starts to operate (step S12). At this time, the server 1 can be preset in an S5 state of ACPI (advanced configuration and power interface) standard. Next, the baseboard management controller 11 reads address data s3 stored in the GbE region 145 of the second non-volatile memory 14, and the address data s3 corresponds to the second MAC address 4. After the baseboard management controller 11 reads the first MAC address 3 of the address data s2 from the first non-volatile memory 13 (step S13) and reads the second MAC address 4 from the second non-volatile memory 14 (step S14), the baseboard management controller 11 compares whether the first MAC address 3 and the second MAC address are the same (step S15). When these two are different (the determination result is "No"), the baseboard management controller 11 updates the first BIOS code data stored in the second non-volatile memory 14 and replaces the original second MAC address 4 with the first MAC address 3 (step S16); and when these two are the same (the determination result is "Yes"), it represents that the baseboard management controller 11 has no need to perform the update operation of the MAC address. The server 1 is set to an S0 state of the ACPI standard (step S17). The aforementioned steps do not necessarily have to be performed in a sequential manner. For example, exchange the order of steps S13 and S14.

According to some embodiments, the server 1 can perform any step from step S11 to step S17 under a POST state. For example, taking the aforementioned first non-volatile memory 13 is an FRU EEPROM and the second non-volatile memory 14 is a flash memory as an example: the first MAC address 3 pre-stored by the network controller (network chipset 12) of the PCH is also backed up in the FRU EEPROM by the device manufacturer at the factory, and the first MAC address 3 is also stored in the flash memory where the server 1 stores the BIOS. Furthermore, the FRU EEPROM and the flash memory can be indirectly connected through other components or be directly connected to the baseboard management controller 11 of the server 1, such as through I²C or SPI interface. When the user or a third party of device maintenance refreshes the flash memory through a serial peripheral interface under a turn-off state of the server 1, the preset first MAC address 3 will also be replaced by a second MAC address 4 that may differ from the preset value. When the server 1 is powered on, the baseboard management controller 11 can be preset to be initiated and operate, while the other portion of the server 1 is in the S5 state of the ACPI standard. Alternatively, a control right to the power management integrated circuit is given to the baseboard management controller 11, such that the baseboard management controller 11 first set the central processing unit 15 to a power-off state after being activated, to prevent the central processing unit 15 from reading the refreshed BIOS in the flash memory to obtain the second MAC address 4 after starting to operate. After the baseboard management controller 11 starts to operate, in the POST process, the baseboard management controller 11 reads the first MAC address stored in the FRU EEPROM and the second MAC address 4 stored in the flash memory to perform the comparison. When the comparison result is different (the determination result is "No"), the baseboard management controller 11 must read the first BIOS code data from the flash memory, replaces the second MAC address 4 from error access back to the first MAC address 3, and then writes it to the flash memory. When the updated is completed or the comparison result is the same (the determination result is "Yes"), the baseboard management controller 11 does not perform the update operation of the MAC address. After that, the server 1 enters an S0 state of the ACPI standard, and the central processing unit 15 being to be able to take over the subsequent POST process. According to some embodiments, by comparing the MAC address first rather than directly replacing the MAC address in the flash memory, the time required for updating the BIOS can be saved as much as possible, and the number of reads and writes of the flash memory can be reduced to prolong the lifespan.

Figure 5:
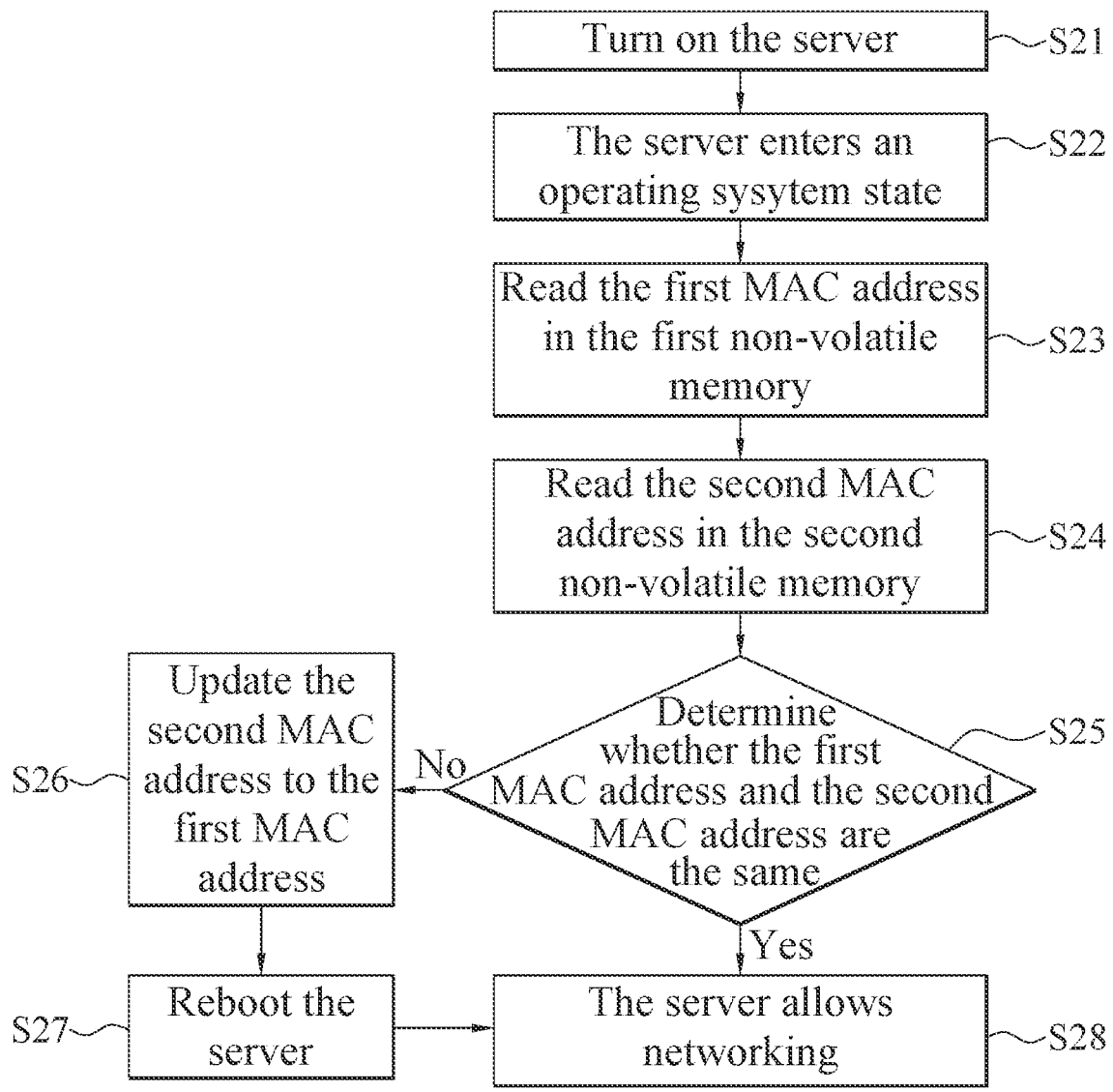
FIG. 5 illustrates a flowchart of the operation of a server of the present application in a third embodiment.

FIG. 5 illustrates a flowchart of the operation of a server of the present application in a third embodiment. Please refer to FIG. 5. According to some embodiments, after the server 1 is turned on (step S21), the server is not in the S5 state of the ACPI standard, but enters an operating system state (step S22). After that, the baseboard management controller 11 performs the check and replacement operation of the MAC address (steps S23 to S26). When the baseboard management controller 11 determines that the first MAC address 3 stored in the first non-volatile memory 13 and the second MAC address 4 stored in the second non-volatile memory 14 are the same (the determination result is "Yes"), the server 1 continues to execute the operating system and allows networking (step S28). On the contrary, when the baseboard management controller 11 determines that the first MAC address 3 and the second MAC address 4 are different (the determination result is "No"), updating the second MAC address 4 stored in the second non-volatile memory 14 to the first MAC address 3 (step S26). After completing the replacement, the server 1 automatically performs a reboot or when the user reboots the server 1 (step S27), the updated first MAC address 3 takes effect, such that the network chipset 12 normally performs its networking function (step S28).

In sum, according to some embodiments, the server 1 can restore the setting of the MAC address. According to some embodiments, the MAC address corresponding to the network chipset 12 is backed up in an FRU EEPROM at the factory, and the baseboard management controller 11 is responsible for checking whether the MAC address in the flash memory storing the BIOS is correct and overwriting the correct MAC address back to the flash memory when an error is found. It make sure that the network service will not fail due to the wrong MAC address after the user updates the BIOS. Furthermore, the aforementioned FRU EEPROM can store factory information of the server 1, that is, the MAC address is backed up in the original FRU EEPROM of the server 1, such that the use of extra memory to store the backup MAC address can be reduced, thereby reducing the production cost of the server 1.

What is claimed is:

1. A server, comprising:
   a network chipset, having a preset first media access control (MAC) address;
   a first non-volatile memory, storing the first MAC address;
   a second non-volatile memory, storing a first basic input/output system (BIOS) code data;
   a central processing unit, coupled to the network chipset and the second non-volatile memory; and
   a baseboard management controller, coupled to the central processing unit, the first non-volatile memory, and the second non-volatile memory, the baseboard management controller is configured to read the first non-volatile memory to obtain the first MAC address, and to store a second BIOS code data comprising the first MAC address to the second non-volatile memory, causing the first BIOS code data to be overwritten by the second BIOS code data, wherein
   the first BIOS code data comprises a second MAC address, the baseboard management controller reads the first non-volatile memory and the second non-volatile memory to compare the first MAC address with the second MAC address before the baseboard management controller stores the second BIOS code data to the second non-volatile memory, and the first BIOS code data is overwritten by the second BIOS code data comprising the first MAC address when the comparison result is different;
   the baseboard management controller compares, in a power-on self-test (POST) process of the server, the first MAC address with the second MAC address and updates the first BIOS code data with the second BIOS code data comprising the first MAC address in the POST process;
   the central processing unit is in a power-off state before the baseboard management controller completes the comparison of the first MAC address with the second MAC address in the POST process; and
   after the baseboard management controller completes the comparison of the first MAC address with the second MAC address in the POST process, the baseboard management controller activates the central processing unit, causing the server enter an S0 state complying with an advanced configuration and power interface (ACPI) standard.

2. The server of claim 1, wherein the baseboard management controller receives a third BIOS code data and a BIOS update command for updating the first BIOS code data from a remote device, and the baseboard management controller incorporates the first MAC address into the third BIOS code data according to the BIOS update command to generate the second BIOS code data.

3. The server of claim 2, wherein when the baseboard management controller incorporates the first MAC address into the third BIOS code data according to the BIOS update command to generate the second BIOS code data, the server is executing an operating system.

4. The server of claim 1, wherein the baseboard management controller transmits the first MAC address to a remote device through a network interface, the remote device incorporates the first MAC address into a third BIOS code data to generate the second BIOS code data, and the baseboard management controller receives the second BIOS code data from the remote device.

5. The server of claim 1, wherein the first non-volatile memory further stores factory information, which includes the first MAC address, of the server.

6. The server of claim 1, wherein the second non-volatile memory comprises a Gigabit Ethernet (GbE) region, and the baseboard management controller is further configured to write the first MAC address into the GbE region of the second non-volatile memory.

7. The server of claim 6, wherein when an offset for the GbE region to store a MAC address is accessed by the baseboard management controller, writing the first MAC address into a storage address of the offset.

8. The server of claim 1, wherein the baseboard management controller compares, in an operating system procedure of the server, the first MAC address with the second MAC address and updates the first BIOS code data with the second BIOS code data comprising the first MAC address in the operating system procedure.

9. The server of claim 8, wherein when the comparison result is different, the server performs a reboot after the baseboard management controller updates the first BIOS code data with the second BIOS code data comprising the first MAC address.

10. The server of claim 1, wherein when the baseboard management controller compares the first MAC address with the second MAC address in the POST process, the server is in an S5 state complying with ACPI standard, causing the central processing unit to be in a power-off state; and wherein when the comparison result is not identical, the baseboard management controller activates the central processing unit after the first BIOS code data is overwritten by the second BIOS code data, causing the server switches to an S0 state complying with the ACPI standard from the S5 state.

11. The server of claim 10, wherein the server is in the S5 state by default after being powered on.

12. A updating method for a media access control (MAC) address, adapted to a server, the server comprises a baseboard management controller, a central processing unit, a first non-volatile memory, and a second non-volatile memory, and the updating method comprises:
the baseboard management controller reads a first MAC address from the first non-volatile memory;
the baseboard management controller receives a third basic input/output system (BIOS) code data and a BIOS update command;
the baseboard management controller incorporates the first MAC address into the third BIOS code data according to the BIOS update command to generate a second BIOS code data; and
the baseboard management controller writes the second BIOS code data to the second non-volatile memory to update a first BIOS code data stored in the second non-volatile memory, wherein
before the baseboard management controller writes the second BIOS code data to the second non-volatile memory, the updating method further comprises:
the baseboard management controller reads a second MAC address from the second non-volatile memory; and
the baseboard management controller compares the first MAC address with the second MAC address and updates the first BIOS code data with the second BIOS code data comprising the first MAC address when the comparison result is different;
the baseboard management controller compares, in a power-on self-test (POST) process, the first MAC address with the second MAC address and the central processing unit is in a power-off state when the server is in an S5 state complying with an advanced configuration and power interface (ACPI) standard; and
when the comparison result is not identical, the baseboard management controller activates the central processing unit after the first BIOS code data is overwritten by the second BIOS code data, causing the server switch to an S0 state complying with the ACPI standard from the S5 state.

13. The updating method of claim 12, wherein the server is in the S5 state by default after being powered on.

* * * * *